US009787079B2

(12) United States Patent
Renaud et al.

(10) Patent No.: US 9,787,079 B2
(45) Date of Patent: Oct. 10, 2017

(54) OVER-CURRENT PROTECTION DEVICE

(75) Inventors: Philippe Renaud, Cugnaux (FR);
Philippe Dupuy, Toulouse (FR)

(73) Assignee: NXP USA, INC., Austin, TX (US)

( * ) Notice: Subject to any disclaimer, the term of this patent is extended or adjusted under 35 U.S.C. 154(b) by 308 days.

(21) Appl. No.: 14/372,608

(22) PCT Filed: Jan. 20, 2012

(86) PCT No.: PCT/IB2012/000246
§ 371 (c)(1),
(2), (4) Date: Jul. 16, 2014

(87) PCT Pub. No.: WO2013/108064
PCT Pub. Date: Jul. 25, 2013

(65) Prior Publication Data
US 2014/0334053 A1    Nov. 13, 2014

(51) Int. Cl.
*H02H 3/02* (2006.01)
*H02H 3/08* (2006.01)

(52) U.S. Cl.
CPC ............... *H02H 3/02* (2013.01); *H02H 3/08* (2013.01)

(58) Field of Classification Search
CPC .................................. H02H 3/02; H02H 3/08
USPC ........................................................ 361/93.9
See application file for complete search history.

(56) References Cited

U.S. PATENT DOCUMENTS

| | | | |
|---|---|---|---|
| 7,064,949 B2 | 6/2006 | Chagny et al. | |
| 7,288,803 B2 | 10/2007 | Beach et al. | |
| 8,284,534 B2 | 10/2012 | Guillot et al. | |
| 2006/0232253 A1 | 10/2006 | Salato et al. | |
| 2007/0139839 A1* | 6/2007 | Yoshihara | H03F 1/52 361/93.1 |
| 2007/0206338 A1* | 9/2007 | Ishino | G05F 1/575 361/93.9 |
| 2007/0279040 A1* | 12/2007 | Ranganathan | G01R 19/0092 324/140 R |
| 2008/0123232 A1 | 5/2008 | Harris et al. | |

(Continued)

FOREIGN PATENT DOCUMENTS

| | | |
|---|---|---|
| JP | 2008-052516 A | 3/2008 |
| JP | 2011-030396 A | 2/2011 |
| KR | 10-2011-0122526 A | 11/2011 |

OTHER PUBLICATIONS

International Search Report and Written Opinion correlating to PCT/IB2012/000246 dated Oct. 23, 2012.

*Primary Examiner* — Thienvu Tran
*Assistant Examiner* — Kevin J Comber

(57) ABSTRACT

An over-current protection circuit including, a current supply switch with a first terminal coupled to a supply current input and with a second terminal coupled to a supply current output. The current supply switch is switchable at least between an on-state, in which the current supply switch provides a conductive connection between the first terminal and the second terminal, and an off-state, in which the current supply switch interrupts the conductive connection between the first terminal and the second terminal. The over-current protection circuit receives a supply current via the supply current input and provides the supply current via the supply current output if the switch is in the on-state. The current supply switch includes a High Electron Mobility Transistor.

20 Claims, 2 Drawing Sheets

(56) References Cited

U.S. PATENT DOCUMENTS

2009/0256616 A1* 10/2009 Garrett ............... H03K 17/0822
   327/309
2011/0156795 A1   6/2011 Sato
2011/0227640 A1   9/2011 Kyono
2011/0241624 A1  10/2011 Park et al.

* cited by examiner

OVER-CURRENT PROTECTION DEVICE

FIELD OF THE INVENTION

This invention relates to an over-current protection circuit, an over-current protection device and an electronic device with an over-current protection circuit and/or device.

BACKGROUND OF THE INVENTION

Electronic devices are nowadays almost ubiquitous. For example, electronic devices are increasingly utilized in automotive systems and car electronics. To protect electric and electronic devices from currents which might destroy them, namely over-currents, which may e.g. occur during a current overshoot event, over-current protection devices are provided. Such devices are often embodied as mechanical fuses which demand a considerable amount of space and need to be manually reset after an over-current event occurred.

SUMMARY OF THE INVENTION

The present invention provides an over-current protection circuit, an over-current protection device and an electronic device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
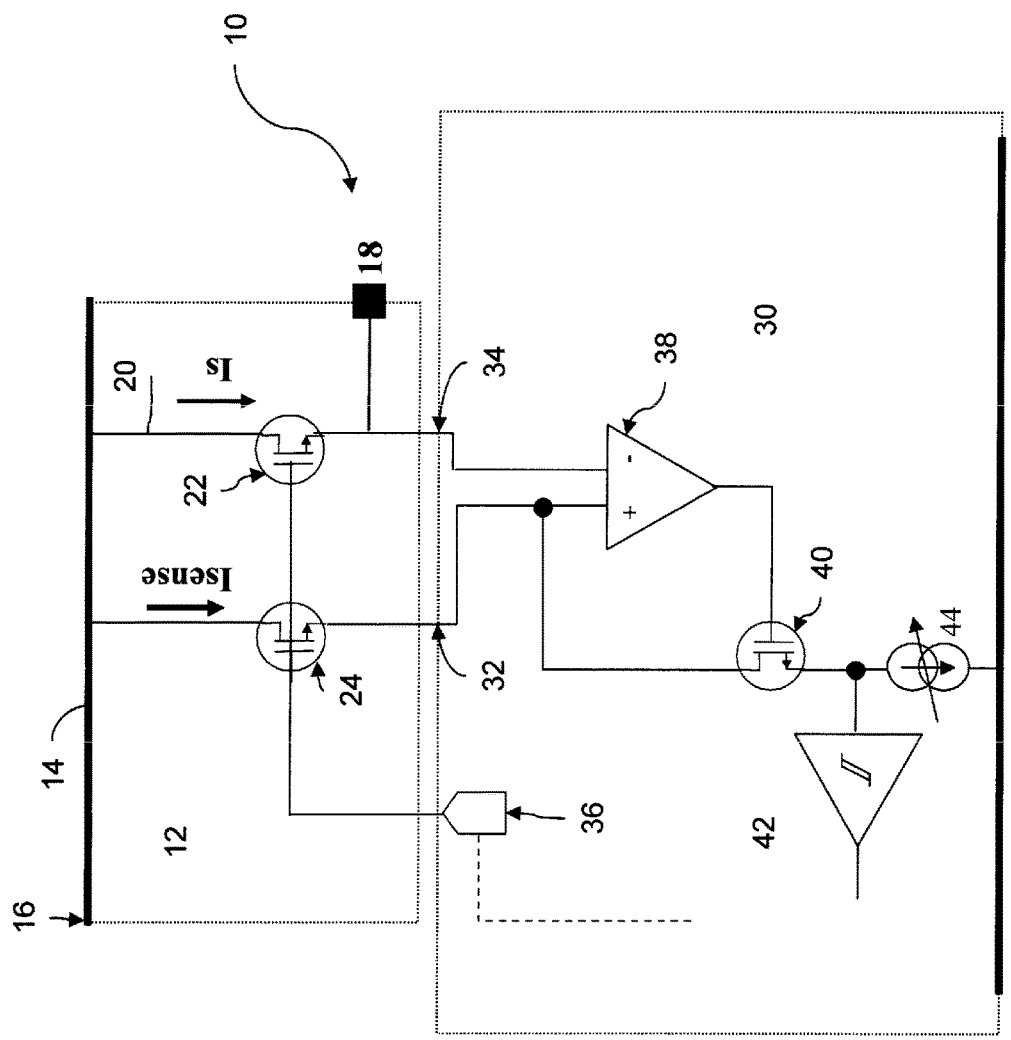
FIG. 1 schematically shows an over-current protection device.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Generally, an over-current protection circuit may be implemented as an electronic circuit and/or as an integrated circuit. The over-current protection circuit may comprise a supply current input, which may be connected or connectable to a power supply, which may provide a supply voltage and/or a supply current. A supply current output of the over-current protection circuit may be connected or connectable to a load. A load may be e.g. an electric or electronic device, e.g., an electronic control unit, a light source, or any other kind of electric or electronic device which may be provided with a supply current.

A switch generally may comprise a first switch terminal, which may be connected or connectable to a current input, e.g. the supply current input. It may be considered that a switch comprises a second switch terminal which may be connected or connectable to a current supply output, e.g. the supply current output. A switch may at least have an on-state, in which the switch provides a conductive connection between the first switch terminal and the second switch terminal, and an off-state, in which the switch interrupts the conductive connective connection between the first switch terminal and the second switch terminal. The switch may be switchable at least between the on-state and the off-state. It may be envisioned that the switch may be controlled to switch between the on-state and the off-state by a switch control device. It is feasible that a switch comprises or is embodied as a transistor, in particular a field effect transistor. Controlling the switch may include providing a gate voltage to a gate electrode of the transistor to switch between the on-state and off-state. The gate voltage may be provided selectively, such that a variable gate voltage may be provided. The first terminal and second terminal of a switch comprising a transistor may be connected to or implemented as source electrode and drain electrode of the transistor. A switch and/or a transistor may generally be arranged on a semiconductor substrate.

An over-current protection circuit may generally comprise a current supply switch, which may be a switch as described generally herein. It may be envisioned that an over-current protection circuit is arranged to receive a supply current via the supply current input and to provide the supply current via the current supply switch and the supply current output if the current supply switch is in the on-state. If the current supply switch is in its off-state, a conductive connection between the supply current input and the supply current output may be interrupted, so that no supply current may flow via the current supply switch. It may be considered that the over-current protection circuit is connected or connectable to a power source via the current input and/or via the current output to a load to provide the supply current to the load. The over-current protection circuit may be supplied with a supply voltage provided by the power source, e.g. via a connection of the current input with a power source. It may be considered that an undesired over-current event occurs if the current strength of the supply current is larger than a given current strength, which may be represented by a limit current or over-current or their corresponding current strengths.

The current supply switch of the over-current protection circuit may comprise and/or be a high electron mobility transistor (HEMT). A high electron mobility transistor is a field effect transistor in which a heterojunction instead of a doped region is used to generate a conductive channel. A heterojunction may occur in a contact region of two layers of semiconductive materials having different band gaps. A two-dimensional electron gas (2DEG) may be generated within that region, i.e., a gas of electrons free to move in essentially two dimensions, in particular in an essentially two-dimensional layer in the contact region. A HEMT may be used as a switch, for example, for high power applications and/or when a fast switching speed may be required. A high electron mobility transistor usually has a low on-state resistance, such that the power demand of the switch in the on-state is low. Also, a HEMT may be implemented with small spatial requirements, allowing a compact implementation of the over-current protection circuit. It may be considered that the HEMT of the current supply switch is a normally-on transistor. A normally-on transistor may be considered to be in an on-state without supply of power to its gate electrode, e.g. if there is no voltage difference between its gate electrode and its first terminal and/or the second terminal, which may be considered to be the source electrode and the drain electrode of the HEMT, respectively. Thus, in the on-state, the normally-on high electron mobility transistor does not draw power from the system. Accordingly, a supply current may be provided by the over-current protection circuit without power loss due to switching the HEMT of the current supply switch into the on-state and/or keeping it in the on-state. It may be envisioned that the HEMT of the current supply switch is a bidirectional transistor. A bidirectional transistor allows a current flow between source electrode and drain electrode as well as current flow between drain electrode and source. Accordingly, it is not necessary to provide a back-to-back transistor structure to enable a bidirectional flow of current, as would be necessary when using metal-oxide field effect transistors (MOSFETs). The over-current protection circuit, hence, may be utilized in a broad range of devices, while requiring only a small die and a small packet size. In particular, the current input and the current output may be reversed depending on a planned application.

A HEMT may be a GaN-transistor. A GaN transistor may comprise at least one GaN layer in contact with another layer to form a contact region. The other layer may in particular be an AlGaN layer. Due its very low on-state resistance, a GaN-transistor may be considered to be particularly suitable for high supply currents and/or high voltages. A high voltage may, for example, refer to a voltage of 10V to 15V, and in particular to 12V, to a voltage between 10V and 100V or even voltages of 100V or higher, for example, 300V or higher. An HEMT, in particular a GaN-transistor, may include or be layered onto a Si-substrate.

It may be considered that an over-current protection circuit comprises a current measure device arranged for measurement of the supply current. Such a current measure device may, for example, comprise or be implemented as a device arranged to branch off a small amount of current from the supply current indicative of the current strength of the supply current. The current measure device may be connected or connectable to a current comparator and/or may comprise a current comparator. A current comparator may be generally arranged to determine whether the supply current is larger than a limit current, which may represent an over-current. For example, a current comparator may be arranged to compare a current provided by the current measure device with a preset limit current, which may be considered to represent an over-current. It may be considered that the current comparator is arranged to determine a value of a current provided by the current measure device and/or the supply current and to compare it with a preset value of the limit current or over-current. Generally, the current measure device may provide a sensor current indicative of the supply current and/or a value representing the current strength of the supply current. Such a value may for example be based on a measurement of the current strength performed by the current measure device. The current strength value may by transmitted in analogue or digital form.

It may be considered that the current supply switch is connected or connectable to a switch control device arranged to control the current supply switch to switch between the on-state and the off-state or vice versa. The switch control device may comprise or be connected or connectable to a current comparator and/or an over-current detection circuit or device or may be embodied without such and/or separately of a current comparator. A current comparator may be a part of an over-current detection circuit or device. It may be considered that the switch control device comprises a logic device arranged to control the current supply switch. The logic device may comprise or be connected to a current comparator and/or an over-current detection circuit or device. An over-current detection circuit or device may be arranged to detect the occurrence of an over-current event and/or to monitor the supply current. The switch control device may be considered to comprise or be connected to a driver element. The driver element may be arranged to provide a gate voltage level and/or control signal to the current supply switch, wherein the gate voltage level may be controllable and/or variable. The control signal or gate voltage level may be provided to a gate electrode of the HEMT of the current supply switch. It may be considered that to control the current supply switch with a normally-on HEMT into the on-state, the driver element may set the gate voltage level of the gate electrode to the supply voltage level provided by the power source, in particular if the first terminal or second terminal of the HEMT are at the supply voltage level. The driver element may be arranged to set the gate voltage level to be different from the supply voltage level to control the switch into the off-state. The driver element may be arranged to control the current supply switch according to a control by a logic device of the switch control device. It may be envisioned that the driver element is connected to control a current measure device. For example, the driver element may be connected to provide a gate voltage to a gate electrode of the current measure device. Generally, a switch control device may be implemented as an integrated circuit. The switch control device may be arranged on the same die, package or device as the over-current protection circuit or on a different die, package or device. In particular, the switch control device, which may also be seen as a control circuit or device, may be implemented on another die with a different technology than the over-current protection circuit, e.g. with Si-based technology.

The current measure device may comprise a measurement transistor, which in particular may be field effect transistor, e.g. a measurement HEMT. A measurement HEMT may be arranged on the same die as the HEMT of the current supply switch. Thus, it is possible to construct the over-current protection circuit with the current measurement device on the same substrate with the same technology. A measurement transistor may be normally-on and/or bidirectional. Generally, it may be envisioned that a driver element controls a gate voltage level of a gate electrode of a measurement transistor to be equal to the gate voltage level of the HEMT of the current supply switch. In particular in the case of a normally-on measurement transistor, it may be envisioned that the measurement transistor is switched off in case of an over-current event to protect it.

There may be considered an over-current protection device comprising an over-current protection circuit as described therein. The over-current protection device may further comprise a switch control device arranged to control the current supply switch of the over-current protection circuit. It may be considered that the switch control device is arranged to control one or more current supply switches of one or more over-current protection circuits and/or one or more over-current protection circuits as described herein. Accordingly, one switch control device, in particular one logic device, may be used to control a plurality of over-current protection circuits or corresponding switches. The switch control device may comprise a limit current control device arranged to set at least one limit current. Such a limit current control device may be connected to a logic device of the switch control device. The limit current control device may be arranged to set a selectable limit current. The limit current may be considered to represent an over-current. In particular, the limit current may represent an upper limit for the supply current. It may be envisioned that the limit current control device is arranged to dynamically set a limit current. The limit current control device may be arranged to set a limit current e.g. based on parameters, which may pertain to the load or device connected or to be connected to the over-current protection circuit. It may be envisioned that the limit current control device is programmable to set and/or dynamically set the limit current.

It may be contemplated that the switch control device is arranged to compare the supply current to the limit current. A corresponding comparison may be performed by comparing a current indicative of the supply current, which may be branched off the supply current, e.g., via the current measure device, with a current indicative of the limit current which may, e.g., be provided by the limit current control device. A comparison may be performed by providing a value representing the supply current, e.g., based on a current provided by a current measure device or based on a value provided by a current measure device, with a value representing the limit current or over-current. The switch control device may be arranged to control the switch into the off-state if the supply current is larger than the limit current. In this case, it may be considered that an over-current event occurs. Due to switching the current supply switch into the off-state, no supply current can be provided by the over-current protection circuit, so that the load connected to the over-current protection circuit is protected from an over-current. It may be considered that the switch control device is arranged to control the current supply switch to switch between its on-state and off-state in pulses. In particular, it may be contemplated to control the current supply switch such that the time-average of the current strength of the supply current corresponds to or is lower than the limit current.

There may be envisioned an electronic device with an over-current protection circuit as described herein and/or an over-current protection device as described herein. The electronic device may comprise a load connected to the over-current protection circuit.

The over-current protection device or circuit is particularly suitable for applications with relatively high power requirements and restrictions regarding weight and space, e.g. automotive applications. For example, electric or electronic devices in cars like electronic control units, lamps or lights, automotive radar devices, etc. may be connected as loads to receive a supply current via an over-current protection circuit as described herein.

Now referring to FIG. 1, an example of a first embodiment of an over-current protection device 10 is shown. The over-current protection device 10 may comprise a first integrated circuit 12, which may be considered to be an over-current protection circuit or power circuit. Accordingly, the die the first integrated circuit is arranged on may be considered to be a power die. The first integrated circuit 12 may comprises a current input 16 which may be connected to a power source providing a supply voltage 14. It may be considered that the first integrated circuit 12 comprises a current output 18. The current output 18 may be connected to the current input 16 via a connection line 20. In connection line 20, there may be arranged a high electron mobility transistor 22 (HEMT) which may be considered to be a current supply switch. In this embodiment, the drain electrode of the current supply switch 22 is connected to current output 18, whereas the source electrode is connected to current input 16. The source electrode may be considered to be a first terminal of current supply switch 22. The drain electrode may be considered to be a second terminal of current supply switch 22. If the current supply switch 22 is in its on-state, a supply current Is may flow between the current input 16 and the current output 18. In its off-state, no supply current may flow. Also connected to current input 16 and provided with the supply voltage 14 may be a sensor device 24.

The sensor device 24 may be provided for measurement of the supply current strength Is by branching off a sensor current Isense of the supply current and may be considered to be a current measure device or a part of such or an over-current detection device or part of such. In this example, the sensor device 24 may be embodied as a transistor device like a field effect transistor.

In particular, it may be implemented as a high electron mobility transistor, which may be implemented or arranged on the same die as the current supply switch 22. As shown in FIG. 1, the current sensor device 24 may be adapted to branch off current Isense from the current between current input 16 and current output 18, in particular between current input 16 and the first terminal of current supply switch 22. It may be feasible that the sensor device 24 is arranged to branch-off a sensor current between the second terminal of current supply switch 22 and the current output 18. The branched-off current Isense may be considered to be indicative of the current strength of the supply current Is. The current supply switch 22 and the sensor device 24 may be arranged such that the branched-off current Isense is much smaller than the supply current Is. For example, it may be considered that the sensor current Isense is equal to Is/10,000. The over-current protection circuit may be implemented in GaN-technology, possibly on a Si-substrate.

The over-current protection device 10 may comprise a second integrated circuit 30, which may be implemented on a different die than the first integrated circuit 12. As the second integrated circuit 30 mainly comprises control circuitry, it may be considered to be a control circuit or a switch control device. It may be arranged on a control die. The second integrated circuit 30 may comprise a sensor current input 32. The sensor current input 32 may provide a connection to the sensor device 24 to receive the sensor current Isense. In particular, the sensor current input 32 may be connected to a drain electrode of sensor device 24. It may be contemplated that the second integrated circuit 30 comprises a supply current input connected to a node between the current output 18 and the drain electrode of current supply switch 22. Alternatively or in addition, the supply current input 34 may be connected to a node between the source electrode of current supply switch 22 and the current input 16. The sensor current input 32 and the supply current input 34 may be connected to corresponding inputs of an operational amplifier 38 of the second integrated circuit 30. An output terminal of the operational amplifier 38 may be connected to a comparator transistor 40, which, e.g., may be a field effect transistor like a MOSFET. In particular, a gate electrode of comparator transistor 40 may be connected to the output of the operative amplifier 38. The source electrode of comparator transistor 40 may be connected to a node between the sensor device 24 and the operative amplifier 38. The drain electrode of comparator transistor 40 may be connected to a comparator 42, which in this case may be implemented as Schmitt-trigger. A current source 44 which may be arranged to provide a variable current may be connected to comparator 42 as well. The current source 44 may be controllable or programmable. It may be envisioned that the current source 44 is arranged to provide a current representing a reference current, which may be indicative of a limit current or over-current. The reference current may be provided based upon a control or program of the current source 44. Via the arrangement of the operational amplifier 38 and the comparator transistor 40, it may be ensured that sensor current Isense provides a reliable representation of Is. The operative amplifier 38, the comparator transistor 40, the reference current source 44, and the comparator 42 may be considered to be part of a comparator circuit arranged to measure the current supplied to the current supply output 18 and to compare it with a reference current. Second integrated circuit may comprise a gate driver 36, which may be considered to be a driver element. Gate driver 36 in this example may be arranged to control the sensor device 24 and the current supply switch 22. It may be envisioned that gate driver 36 is connected to the gate electrode of current supply switch 22 to provide it with a gate voltage level. Gate driver 36 may be connected to the gate electrode of sensor device 24 to provide it with the same gate voltage level. In particular, gate driver 36 may be arranged to switch the current supply switch 22 and/or sensor device 24 between their respective on-states and off-states. Gate driver 36 may be connected to further control circuitry of integrated circuit 30 (not shown), which may be arranged to control the gate driver 36 and/or current supply switch 22 based upon the output of comparator 42. As in this example, the sensor device 24 and the current supply switch 22 may be implemented as normally-on HEMTs, the gate driver 36 will provide them with a voltage level corresponding to the supply voltage to switch them into their respective on-states. To switch them off, the gate driver 36 may be arranged to change the voltage level at the gate electrodes. Accordingly, the on-state of current supply switch 22, in which a supply current Is may flow, does not lead to a power drain to activate the switch. Thus, the amount of power required to provide a supply current may be minimized. Should an over-current event be detected, the gate driver 36 may be controlled to switch off current supply switch 22. The sensor device 24 may be controlled analogously. The second integrated circuit 30 may generally be arranged to determine the occurrence of over-current events and/or to monitor the supply current and may comprise an over-current detection circuit, one possible implementation being shown in FIG. 1. The second integrated circuit 30 may further generally comprise a switch control circuit or device arranged to control the current supply switch 22 based on a signal provided by the over-current detection circuit. It may be considered to implement the second integrated circuit in Si-based technology.

Figure 2:
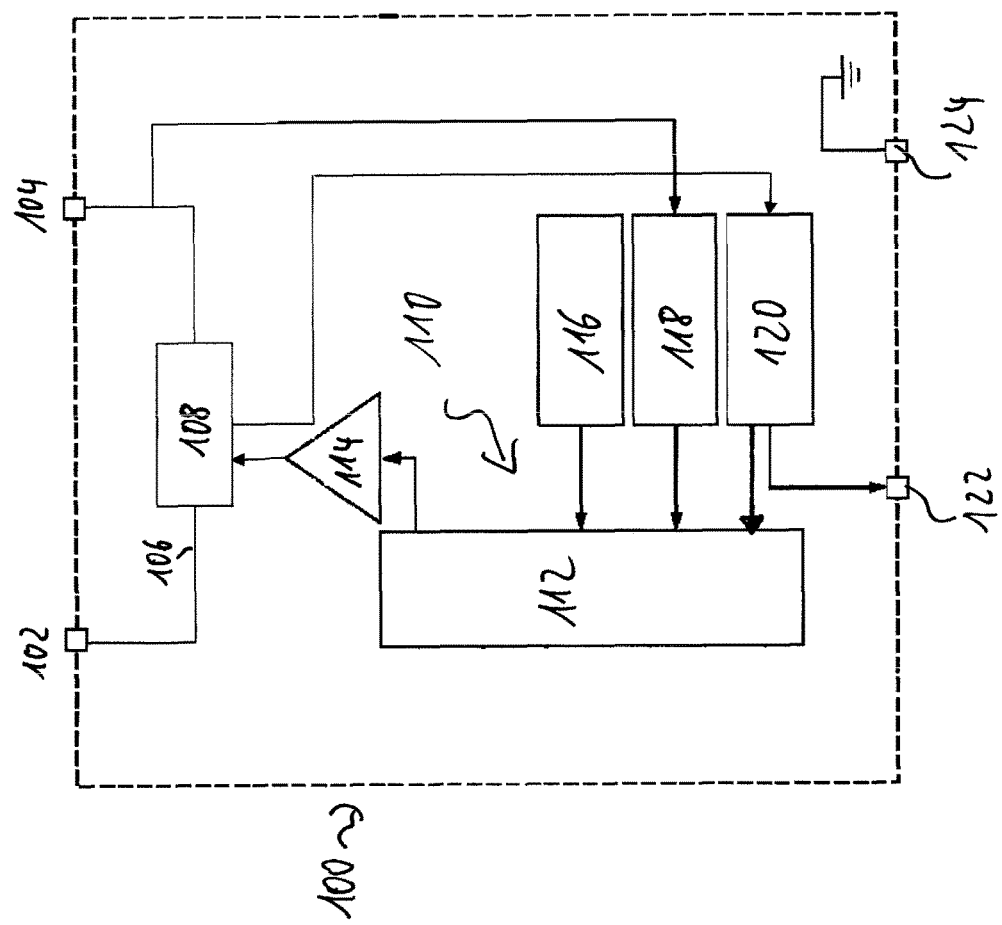
FIG. 2 schematically shows a variant of an over-current protection device.

FIG. 2 schematically shows a further variant of an over-current protection device 100. The over-current protection device 100 comprises a current input 102 and a current output 104 corresponding to input 16 and output 18 of FIG. 1. The current input 102 is connected to the supply current output 104 via a supply current line 106 in which an over-current protection circuit 108 is arranged. The over-current protection circuit 108 may comprise a normally-on current supply HEMT arranged to provide a conductive connection between input 102 and output 104 analogously to current supply switch 22 described with reference to FIG. 1. It may be considered that over-current protection circuit 108 is implemented as first integrated circuit 10 of FIG. 1. It may be contemplated that current input 102 is connected or connectable to a power source providing a supply voltage and capable of providing a supply current.

The over-current protection device 100 comprises a switch control device 110 comprising a logic device 112. The switch control device 110 may be considered to be a control circuit. The logic device 112 may be connected to a gate driver 114. The gate driver 114 may be connected to the gate electrode of switch 108. The gate driver 114 may be arranged to control and/or switch the HEMT of the over-current protection circuit 108 based on signals from the logic device 112. For this purpose, gate driver 114 may be arranged to provide or set a gate voltage level of a gate electrode of the HEMT of over-current protection circuit 108 analogously to gate driver 36 described above. The logic device 112 may be implemented as an electronic control unit, e.g. a microprocessor or IC. It may be considered that the logic device 112 is connected to a limit current control device 116 of switch control device 110 which may be arranged to set an over-current and/or to provide an over-current value. The over-current or over-current value may be considered to represent a limit current for a supply current flowing between the current input 102 and the current output 104. If the supply current is larger than the limit current or the over-current, it may be considered that an over-current event occurs. In the case that an over-current occurs, the logic device 112 may control the gate driver 114 to bring the current supply HEMT of over-current protection circuit 108 into its off-state by changing the gate voltage level provided. The switch control device 110 may be connected to a supply voltage provide by the power source via a voltage supply connection 118 of switch control device 110. This supply voltage may e.g. be utilized to provide a gate voltage level by the gate driver 36. Switch control device 110 may comprise an over-current detection circuit or device 120, which may generally be arranged to detect the occurrence of an over-current event and/or monitor the supply current. This over-current detection device 120 may be connected to over-current protection circuit 108 to receive a current indicative of the current strength of the supply current, e.g. a current Isense as described above. It may be feasible to implement the over-current detection circuit 120 as outlined above in context of FIG. 1. Over-current detection circuit 120 may be connected to logic device 112. It may be contemplated to arrange the over-current detection device 120 to provide a signal indicative of a detection of an over-current event to the logic device 112. Over-current detection device 120 may be connected to a current signal output 122 arranged to provide a signal indicative of an over-current event detection for uses outside of the switch control device 110. The over-current protection device 100 may be provided with a grounding connection 124. The logic device 112 and/or the switch control device 110 may be arranged to be connected to and/or to control more than one over-current protection circuit 108. In this case, it may be feasible to arrange the switch control device 110 and/or the limit current control device 116 to define, set, monitor and/or control different limit currents for different over-current protection circuits 108. It should be noted that the HEMT of the over-current protection circuit is normally-on. Therefore, the over-current protection circuit is able to provide an instant reaction to a voltage and/or current supplied to its input without the necessity of providing a complicated auto-wake function. The over-current protection circuit and/or the over-current protection device may be implemented without an auto-wake function or auto-wake circuitry for the over-current protection circuit.

It may be seen from FIGS. 1 and 2 that the functions of the current input 16 and the current output 18, respectively current input 102 and current output 104 may be easily reversed, as the HEMT of the over-current protection circuit is bidirectional.

In the foregoing specification, the invention has been described with reference to specific examples of embodiments of the invention. It will, however, be evident that various modifications and changes may be made therein without departing from the broader spirit and scope of the invention as set forth in the appended claims.

For example, the semiconductor substrate described herein can be any semiconductor material or combinations of materials, such as gallium arsenide, silicon germanium, silicon-on-insulator (SOI), silicon, monocrystalline silicon, the like, and combinations of the above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks or circuits are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Also for example, in one embodiment, the illustrated examples may be implemented as circuitry located on a single integrated circuit or within a same die or device. For example, the first integrated circuit and the second integrated circuit, respectively the power circuit and the control circuit, may be implemented as one circuit and/or on one die or device. Alternatively, the examples may be implemented as any number of separate integrated circuits or separate devices interconnected with each other in a suitable manner. For example, the power circuit or over-current protection circuit may be implemented separately from the control circuit. It may be feasible to implement an over-current detection circuit in the power circuit, which may be provided with a reference current indicative of a limit current. It may be considered to implement a current measure device separate from the over-current protection circuit, in particular on a different die or package. The current measure device may e.g. be implemented in the control circuit or separately from both the control circuit and the over-current protection circuit. It may be considered that the current measure device generally is arranged to provide a sensor current indicative of the supply current and/or to provide a current value indicative of the supply current strength.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An over-current protection circuit comprising:
   a supply current input;
   a supply current output;
   a current supply switch comprising
      a first switch terminal coupled to the supply current input,
      a second switch terminal coupled to the supply current output,
      a third switch terminal coupled to a gate driver, and
      a high electron mobility transistor (HEMT) comprising a first current electrode coupled to the first switch terminal, a second current electrode coupled to the second switch terminal, and a control electrode coupled to the third switch terminal, wherein
      the current supply switch provides an on-state, in which the current supply switch provides a conductive connection between the first switch terminal and the second switch terminal, and an off-state, in which the current supply switch interrupts the conductive connection between the first switch terminal and the second switch terminal wherein the HEMT is a normally-on transistor;
   a sense transistor comprising a first current electrode coupled to the first switch terminal, a second current electrode, and a control electrode coupled to the third switch terminal; and
   a switch control device including:
      an operational amplifier having a first input terminal coupled to the second current electrode of the sense transistor, a second input terminal coupled to the second switch terminal, and an output terminal:
      a comparator transistor having a first current electrode coupled to the in put terminal of the operational amplifier, a second current electrode, and a control electrode coupled to the output terminal of the operational amplifier; and
      a comparator having an input terminal coupled to the second current electrode of the comparator transistor, and an output terminal coupled to the gate driver;
      the switch control device arranged to control the current supply switch of an over-current protection device based on level of a supply current provided to the over-current protection circuit, and to control the current supply switch into the off-state if the supply current is larger than a limit current, and wherein the over-current protection circuit provides an instant reaction to the supply current being larger than the limit current based on the HEMT being the normally-on transistor; and
   the over-current protection circuit is configured to receive the supply current via the supply current input and to provide the supply current via the supply current output if the current supply switch is in the on-state.

2. Over-current protection circuit according to claim 1, wherein the HEMT is a bidirectional transistor.

3. Over-current protection circuit according to claim 1, wherein the HEMT is a GaN transistor.

4. Over-current protection circuit according to claim 1, further comprising a current measure device arranged for measurement of the supply current.

5. Over-current protection circuit according to claim 4, wherein the current supply switch is connected or connectable to the switch control device arranged to control the current supply switch to switch between the on-state and the off-state or vice versa.

6. Over-current protection circuit according to claim 5, wherein the switch control device is arranged to control the current supply switch based on a current value measured via the current measure device.

7. Over-current protection circuit according to claims 4, wherein the current measure device comprises a measurement HEMT.

8. Over-current protection circuit according to claim 7, wherein the measurement HEMT is arranged on the same die as the HEMT of the current supply switch.

9. Over-current protection device according to claim 1, wherein the switch control device comprises a limit current control device arranged to set at least one limit current.

10. Over-current protection device according to claim 9, wherein the at least one limit current represents an upper limit for supply current.

11. Over-current protection device according to claim 1, wherein the switch control device is arranged to compare the supply current to the limit current.

12. Electronic device with an over-current protection circuit according to claim 1.

13. The over-current protection circuit of claim 1, the gate driver to control the on-off state of both the HEMT and the sense transistor based on a sense current from the sense transistor and a supply current from the HEMT.

14. An over-current protection circuit comprising:
   a first die comprising a first integrated circuit, the first integrated circuit comprising a control circuit, the control circuit comprising a gate driver;
   a second die comprising a second integrated circuit, the second integrated circuit comprising:
      a supply current input;
      a supply current output;
      a current supply switch comprising
         a first switch terminal coupled to the supply current input,
         a second switch terminal coupled to the supply current output, and
         a high electron mobility transistor (HEMT), wherein
         the current supply switch provides an on-state, in which the current supply switch provides a conductive connection between the first switch terminal and the second switch terminal, and an off-state, in which the current supply switch interrupts the conductive connection between the first switch terminal and the second switch terminal; and
      a switch control device including:
         an operational amplifier having a first input terminal coupled to the second current electrode of the sense transistor a second input terminal coupled to the second switch terminal, and an output terminal;
         a comparator transistor having a first current electrode coupled to the first in put terminal of the operational amplifier, a second current electrode, and a control electrode coupled to the output terminal of the operational amplifier; and
         a comparator having an input terminal coupled to the second current electrode of the comparator transistor, and an output terminal coupled to the gate driver;

the switch control device arranged to control the current supply switch of an over-current protection device based on level of a supply current provided to the over-current protection circuit, and to control the current supply switch into the off-state if the supply current is larger than a limit current, and wherein the over-current protection circuit provides an instant reaction to the supply current being larger than the limit current based on the HEMT being a normally-on transistor; and the over-current protection circuit is configured to receive a supply current via the supply current input and to provide the supply current via the supply current output if the current supply switch is in the on-state.

15. The over-current protection circuit of claim 14, the control circuit further comprising:
a sensor current input to receive a sense current; and
a supply current input to receive the supply current from the second current electrode of the HEMT, wherein the control circuit compares the sense current with the supply current.

16. The over-current protection circuit of claim 14, wherein the HEMT is a GaN transistor.

17. An over-current protection circuit comprising:
a first die comprising a first integrated circuit, the first integrated circuit comprising a control circuit, the control circuit comprising a gate driver;
a second die comprising a second integrated circuit, the second integrated circuit comprising:
a supply current input;
a supply current output;
a current supply switch comprising:
a first switch terminal coupled to the supply current input;
a second switch terminal coupled to the supply current output;
a third switch terminal coupled to the gate driver;
a high electron mobility transistor (HEMT) comprising a first current electrode coupled to the first switch terminal, a second current electrode coupled to the second switch terminal, and a control electrode coupled to the third switch terminal, wherein
the current supply switch provides an on-state, in which the current supply switch provides a conductive connection between the first switch terminal and the second switch terminal, and an off-state, in which the current supply switch interrupts the conductive connection between the first switch terminal and the second switch terminal;
a sense transistor comprising a first current electrode coupled to the first switch terminal, a second current electrode, and a control electrode coupled to the third switch terminal; and
a switch control device including:
an operational amplifier having a first input terminal coupled to the second current electrode of the sense transistor, a second input terminal coupled to the second switch terminal, and an output terminal;
a comparator transistor having a first current electrode coupled to the first in put terminal of the operational amplifier, a second current electrode, and a control electrode coupled to the output terminal of the operational amplifier; and
a comparator having an input terminal coupled to the second current electrode of the comparator transistor, and an output terminal coupled to the gate driver;
the switch control device arranged to control the current supply switch of an over-current protection device based on level of a supply current provided to the over-current protection circuit, and to control the current supply switch into the off-state if the supply current is larger than a limit current, and wherein the over-current protection circuit provides an instant reaction to the supply current being larger than the limit current based on the HEMT being a normally-on transistor;
the over-current protection circuit is configured to receive a supply current via the supply current input and to provide the supply current via the supply current output if the current supply switch is in the on-state.

18. The over-current protection circuit of claim 17, the control circuit further comprising:
a sensor current input to receive a sense current from the second current electrode of the sense transistor; and
a supply current input to receive a supply current from the second current electrode of the HEMT, wherein the control circuit compares the sense current with the supply current.

19. The over-current protection circuit of claim 17, wherein the HEMT is a bidirectional transistor.

20. The over-current protection circuit of claim 17, wherein the HEMT is a GaN transistor.

* * * * *